United States Patent
Serdarevic

(10) Patent No.: US 8,294,436 B2
(45) Date of Patent: Oct. 23, 2012

(54) DC/DC CONVERTER AND METHOD FOR CONTROLLING A DC/DC CONVERTER

(75) Inventor: Emir Serdarevic, Graz (AT)

(73) Assignee: Austriamicrosystems AG, Unterpremstätten (AT)

( * ) Notice: Subject to any disclaimer, the term of this patent is extended or adjusted under 35 U.S.C. 154(b) by 445 days.

(21) Appl. No.: 12/700,639

(22) Filed: Feb. 4, 2010

(65) Prior Publication Data

US 2010/0194366 A1 Aug. 5, 2010

(30) Foreign Application Priority Data

Feb. 5, 2009 (EP) .................................... 09001630

(51) Int. Cl.
*G05F 1/10* (2006.01)
*G05F 1/40* (2006.01)

(52) U.S. Cl. .................... 323/225; 323/284; 323/285

(58) Field of Classification Search ............... 323/222, 323/225, 282, 284, 285, 288, 351
See application file for complete search history.

(56) References Cited

U.S. PATENT DOCUMENTS

| | | | |
|---|---|---|---|
| 6,150,798 A | 11/2000 | Ferry et al. | |
| 7,084,611 B2 * | 8/2006 | Kirchner et al. | 323/222 |
| 7,692,416 B2 * | 4/2010 | Shimizu | 323/271 |
| 7,994,765 B2 * | 8/2011 | Takada et al. | 323/282 |
| 2003/0151423 A1 | 8/2003 | Ishii | |
| 2003/0178974 A1 | 9/2003 | Rozsypal | |
| 2004/0135556 A1 | 7/2004 | Kirchner et al. | |
| 2007/0057658 A1 | 3/2007 | Hasegawa | |
| 2007/0069703 A1 | 3/2007 | Kokubun et al. | |
| 2008/0211467 A1 | 9/2008 | Huang et al. | |
| 2008/0239774 A1 | 10/2008 | Canfield et al. | |

FOREIGN PATENT DOCUMENTS

DE 102 49 802 5/2004

OTHER PUBLICATIONS

Austriamicrosystems AG, "AS1329 Low Voltage, Micropower, DC-DC Step-Up Converters" Revision 1.06, pp. 1-19, 2009.
Austriamicrosystems AG, "AS1331 300mA Buck-Boost Synchronous DC/DC Converters" Revision 1.02, pp. 1-16, 2009.
Texas Instruments Inc., "TPS61028—96% Efficient Synchronous Boost Converter" Datasheet, 2006.

* cited by examiner

*Primary Examiner* — Jessica Han
(74) *Attorney, Agent, or Firm* — Cozen O'Connor

(57) ABSTRACT

A DC/DC converter comprises an inductive element (L) having a first terminal connected to an input connection (1) and a second terminal (4) coupled to a reference potential connection (3) by a first switching element (N1). A second switching element (P1) being a p-channel field-effect transistor couples the second terminal (4) to an output connection (2). A control unit (CTL) comprises a detection unit which is configured to detect a first mode of operation in which an input voltage (VIN) is higher than a desired output voltage (VOUT). The control unit is configured, upon detection of the first mode of operation, during a first phase (PH1) to control the first switching element (N1) to a closed state and a second switching element (P1) to an open state, during a second phase (PH2) which comprises a first sub-phase (PH2A) and a second sub-phase (PH2B), to control the first switching element (N1) to an open state, during the first sub-phase (PH2A), to control the second switching element (P1) to a closed state, and, during the second sub-phase (PH2B), to provide a control voltage to a gate terminal of the second switching element (P1) which is higher than a difference between an output voltage (VOUT) and a threshold voltage of the second switching element (P1).

16 Claims, 2 Drawing Sheets

PH1:

PH2A:

PH2B:

DC/DC CONVERTER AND METHOD FOR CONTROLLING A DC/DC CONVERTER

RELATED APPLICATION

This application claims the priority of European application no. 09001630.4 filed Feb. 5, 2009, the entire content of which is hereby incorporated by reference.

BACKGROUND OF THE INVENTION

In many cases, the power supply of electric circuits is achieved by DC/DC converters which are able to convert an input DC voltage to an output DC voltage being different from the input DC voltage. If a desired output voltage is higher than the input voltage, an up conversion has to be performed which is achieved, for example, by boost converters. If, however, the desired output voltage is lower than the input voltage, a down conversion has to be performed which is achieved, for example, by linear regulators or buck converters.

In some applications, both up and down conversion may be needed due to changing input or output voltages. Furthermore, for example for a fixed desired output voltage, which is to be derived from a battery powered input voltage, with a fully charged battery, a down conversion is needed, whereas after discharging of the battery, up conversion of the input voltage may be needed.

To this end, nowadays buck-boost converters are used being able to convert the input voltage up and down.

However, costs for implementing buck-boost converters are higher because of their more complicated structure and a higher area when implemented in an integrated circuit.

SUMMARY OF THE INVENTION

It is an object of the invention to provide a DC/DC converter which is able to efficiently perform both up conversion and down conversion with a simple structure. It is also an object of the invention to provide a method for efficiently operating such a DC/DC converter.

An embodiment of a DC/DC converter comprises an input connection to receive an input voltage, an output connection to provide an output voltage and a reference potential connection. An inductive element has a first terminal connected to the input connection and a second terminal coupled to the reference potential connection by a first switching element. A second switching element couples the second terminal of the inductive element to the output connection, wherein the second switching element is a p-channel field-effect transistor, P-FET. A control unit comprises a detection unit which is configured to detect a first mode of operation in which the input voltage is higher than a desired value of the output voltage. The control unit is configured, upon detection of the first mode of operation, during a first phase, to control the first switching element to a close state and a second switching element to an open state. During a second phase, which comprises a first sub-phase and a second sub-phase, the control unit controls the first switching element to an open state. During the first sub-phase, the second switching element is controlled to a closed state and, during the second sub-phase, the control unit provides a control voltage to a gate terminal of the second switching element which is higher than the difference between the output voltage and a threshold voltage of the second switching element.

Accordingly, during the first phase, the inductive element is coupled between the input connection and the reference potential connection such that current flows through the inductive element and energy is stored within. During the second phase, the first switching element is in an open state such that no current can flow from the second terminal of the inductive element to the reference potential connection. However, during the first sub-phase, a current can flow from the second terminal of the inductive element to the output connection via the fully closed second switching element. During the second sub-phase, due to the control voltage applied and the current flowing from the inductive element, the p-channel field-effect transistor is conducting with a high resistance. As a consequence, less energy is transferred from the inductive element to the output connection, thus enabling a down conversion.

Although some energy is lost in the second switching element during the second sub-phase, energy can be transferred from the inductive element to the output connection during the first sub-phase nearly lossless. Therefore, the overall efficiency of the DC/DC converter during a down conversion is improved compared, for example, to a conventional buck converter or a low dropout regulator.

The control unit can, for example, use the voltage at the output connection, thus the output voltage, as the control voltage provided to the gate terminal of the second switching element.

In another embodiment, the control unit is configured, upon detection of the first mode of operation, during the second sub-phase, to provide a control voltage to the gate terminal of the second switching element which is higher than the difference between the input voltage and the threshold voltage of the second switching element. For example, the control unit uses the input voltage as the control voltage to be provided to the gate terminal.

In one embodiment, upon detection of the first mode of operation, the second phase comprises at least one further sub-phase during which the second switching element is controlled according to the control of the first sub-phase or of the second sub-phase. For example, the second phase comprises a sequence of a first sub-phase, a second sub-phase and a third sub-phase being equivalent to the first sub-phase with respect to the control of the second switching element. Durations of first and third sub-phase can differ from each other. In another embodiment, the second phase comprises a sequence of a second sub-phase, a first sub-phase and a third sub-phase being equivalent to the second sub-phase with respect to the switch control.

If the second phase comprises only two sub-phases, the order of the first and the second sub-phase within the second phase can be chosen arbitrarily. Furthermore, the number of sub-phases within the second phase is theoretically unlimited, but may be limited practically. For example, on the one hand, with a greater number of sub-phases, a smoother provision of current to the output connection can be achieved. On the other hand, switching of the P-FET usually causes losses.

The second phase preferably only comprises sub-phases during which the switching elements are controlled according to the first and the second sub-phase.

The DC/DC converter or the control unit, respectively, can be operated based on a reference clock signal provided externally or generated internally. Accordingly, in one embodiment, upon detection of the first mode of operation, the first phase and the second phase are alternating within clock periods determined by the reference clock signal.

In various embodiments, the output voltage is controlled by the control unit. For example, upon detection of the first mode of operation, a duration of the first phase is set depending on the desired value of the output voltage.

In another embodiment, upon detection of the first mode of operation, duration of the first sub-phase or of the second sub-phase is adjusted depending on at least one of the following: a ratio between the input voltage and the output voltage, a current drawn by a load connected to the output connection, a desired line regulation value. For example, a duration of the first sub-phase can be decreased if a ratio between the input voltage and the output voltage decreases. If an output current of the DC/DC converter is measured, the duration of the first sub-phase can be increased for an increasing output current. Furthermore, line regulation, that is the capability to maintain a constant output voltage despite changes to the input voltage, can be influenced by the respective durations of the first and the second sub-phase.

In various embodiments, the first switching element is an n-channel field-effect transistor, N-FET. Preferably, the first and the second switching elements being an N-FET and a P-FET are field-effect transistors of an enhancement type. In other words, the N-FET and the P-FET are normally off, that is in an open state.

In various embodiments, a charge store is connected to the output connection. For example, the charge store is connected between the output connection and the reference potential connection. Accordingly, a current provided by the inductive element during the second phase can be used to charge the charge store to the desired value of the output voltage. Furthermore, the output voltage can be buffered by the charge store.

The embodiments described above are related to down conversion, i.e. where the input voltage is higher than the desired value of the output voltage. However, the structure of the DC/DC converter can also be used for up conversion, i.e. wherein the input voltage is lower than the desired value of the output voltage.

To this end, in one embodiment, the detection unit is configured to detect a second mode of operation in which the input voltage is lower than the desired value of the output voltage. In this case, the control unit is configured, upon detection of the second mode of operation, to alternately and conversely control the first switching element and the second switching element between an open state and a closed state, wherein a respective duty cycle is depending on the desired value of the output voltage.

In other words, for up conversion in the second mode of operation, one switching element of the first and the second switching element is in an open state while the other switching element is in a closed state. If the first switching element is in a closed state, energy is stored in the inductive element, whereas, if the second switching element is in the closed state, energy is transferred from the inductive element to the output connection. The dependency of the above-mentioned duty cycle with respect to the desired output voltage is not described in detail here, as such control is well known in the art.

If the desired value of the output voltage is reached, that is, if the output voltage is higher than the desired value or than the desired value plus a respective threshold voltage, both for the first and the second mode of operation corresponding to down conversion and up conversion, switching of the first and second switching elements can be stopped. Accordingly, no energy is transferred from the input connection to the output connection. To this end, in one embodiment, the detection unit is configured to detect a third mode of operation in which the output voltage is higher than the desired value of the output voltage. In this case, the control unit is configured, upon detection of the third mode of operation, to control both the first switching element and the second switching element to an open state.

Accordingly, no energy is stored in the inductive element and no energy can be transferred from the inductive element to the output connection. However, if energy is needed at the output connection, the output voltage will decrease. If the output voltage falls below the desired value or the desired value minus a respective threshold voltage, switching can be started again, either according to the first mode of operation or the second mode of operation, depending on the input voltage and the desired value of the output voltage.

Due to the various control voltages applied to the gate terminal of the second switching element, it may be useful to control a voltage at a bulk terminal of the second switching element or P-FET, respectively, because of the semiconductor characteristics of the P-FET. To this end, the detection unit is, for example, configured to detect a maximum voltage within the DC/DC converter. The control unit is then configured to provide said maximum voltage to the bulk terminal of the second switching element.

In the following, an embodiment of a method for controlling a DC/DC converter is described. Herein, the DC/DC converter comprises an input connection to receive an input voltage, an output connection to provide an output voltage, a reference potential connection, an inductive element having a first terminal connected to the input connection, a first switching element coupling a second terminal of the inductive element to the reference potential connection, and a second switching element coupling the second terminal of the inductive element to the output connection, the second switching element being a p-channel field-effect transistor, P-FET. In the method, a first mode of operation is detected in which the input voltage is higher than a desired value of the output voltage, and, upon detection of the first mode of operation, the following is performed. During a first phase, the first switching element is controlled to a closed state and the second switching element is controlled to an open state. During a second phase, which comprises a first sub-phase and a second sub-phase, the first switching element is controlled to an open state. During the first sub-phase, the second switching element is controlled to a closed state and, during the second sub-phase, a control voltage is provided to a gate terminal of the second switching element which is higher than a difference between the output voltage and a threshold voltage of the second switching element.

Further embodiments of the method correspond to the control procedures described above for the various embodiments of the DC/DC converter.

BRIEF DESCRIPTION OF THE DRAWINGS

The text below explains the invention in detail using exemplary embodiments with reference to the drawings, in which.

DETAILED DESCRIPTION OF THE DRAWINGS

Figure 1:
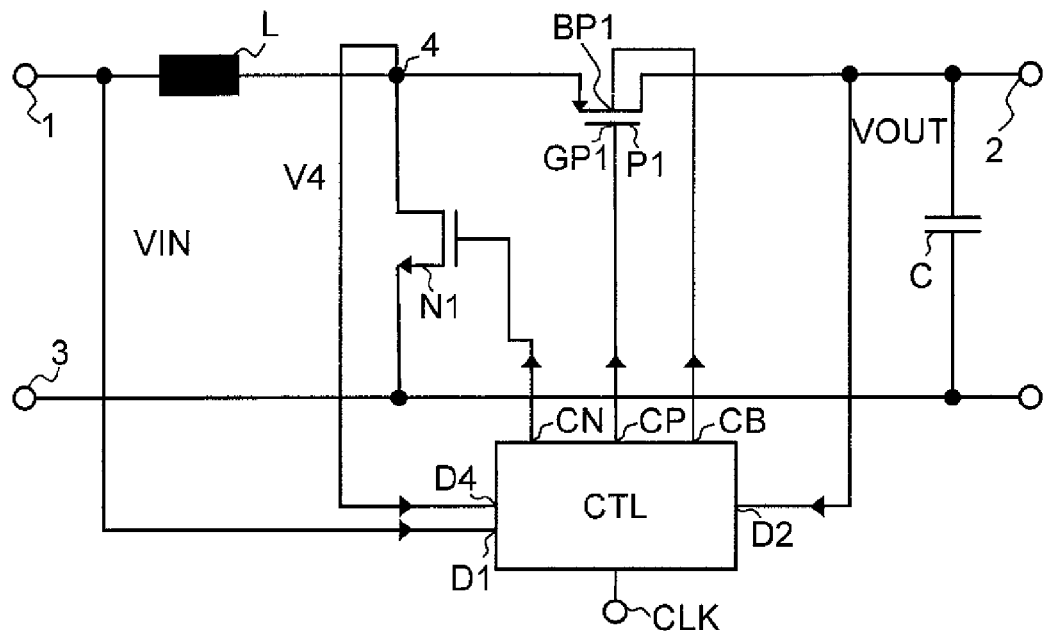
FIG. 1 is an embodiment of a DC/DC converter.

In the drawings, like reference numerals designate corresponding similar parts or elements.

FIG. 1 shows an embodiment of a DC/DC converter comprising an input connection 1, an output connection 2 and a reference potential connection 3. An inductive element L has a first terminal connected to the input connection 1 and a second terminal 4. The second terminal 4 is coupled to the reference potential connection 3 by means of a first switching element N1 which is embodied as an n-channel field-effect transistor, N-FET. The second terminal 4 of the inductive element L is further coupled to the output connection 2 by means of second switching element P1 which is embodied as a p-channel field-effect transistor, P-FET. A charge store C is connected between the output connection 2 and the reference potential connection 3.

The DC/DC converter further comprises a control unit CTL comprising input terminals D1, D2, D4 and output terminals CN, CP, CB. Published US patent application no. 2004/0013556 discloses a control unit that can be used as control unit CTL. The control unit CTL comprises a clock input CLK for receiving a reference clock signal. The input terminal D1 is connected to the input connection 1 for detecting or measuring an input voltage VIN at the input connection 1. The input terminal D2 is connected to the output connection 2 for measuring or detecting an output voltage VOUT. Furthermore, the input terminal D4 is connected to the second terminal 4 of the inductive element for measuring or detecting a voltage V4 at said terminal 4. Output terminal CN is connected to a control terminal of the N-FET N1, output terminal CP is connected to the gate terminal GP1 of the P-FET P1. Output terminal CB is connected to a bulk terminal BP1 of the P-FET P1.

The field-effect transistors N1, P1 are of the enhancement type in this embodiment. In other words, the transistors are normally off or non-conducting if no control voltage is applied to their gate terminals.

The DC/DC converter can be operated in various modes of operation. For example, in a first mode of operation, the input voltage VIN is higher than a desired value of the output voltage VOUT, thus resulting in the need for a down conversion. Accordingly, in a first mode of operation, the DC/DC converter is configured for down converting the input voltage VIN. In a second mode of operation, the input voltage VIN is lower than a desired value of the output voltage VOUT, such that an up conversion is needed. Accordingly, in a second mode of operation, the DC/DC converter is configured for up converting the input voltage VIN.

During the first and the second mode of operation, energy is transferred from the input connection 1 to the output connection 2 and, for example, stored in the charge store C. Accordingly, the charge store C is charged to an actual value of the output voltage. If said actual output voltage is lower than the desired value of the output voltage VOUT, further energy is to be transferred to the charge store C during up conversion and down conversion. However, if the actual value of the output voltage VOUT exceeds the desired value, the process of up conversion or down conversion can be stopped until the output voltage VOUT falls below the desired value again. Stopping of the up conversion and down conversion results in a third mode of operation during which no switching and therefore no energy transfer from the input connection 1 to the output connection 2 is performed.

The control unit CTL comprises a detection unit which is not shown here for reasons of a better overview. In the above-mentioned US 2004/0013556, such a detection unit involves detection of voltage levels performed with comparators. The detection unit is configured to evaluate the respective voltages provided at the input terminals D1, D2, D4. For example, the detection unit detects whether the DC/DC converter is to be operated in the first mode of operation, in the second mode of operation or in the third mode of operation.

During operation of the DC/DC converter, a load can be connected to the output connection 2 which draws current from the input connection 1 or the charge store C. The reference potential connection 3, for example, is coupled to a ground terminal.

Respective control voltages provides at the output terminals CN, CP, CB for the transistors N1, P1 can, for example, be derived from the voltages VIN, VOUT and V4.

Operation of the DC/DC converter for the different modes of operation is described in the following in conjunction with FIGS. 2, 3 and 4.

Figure 2:
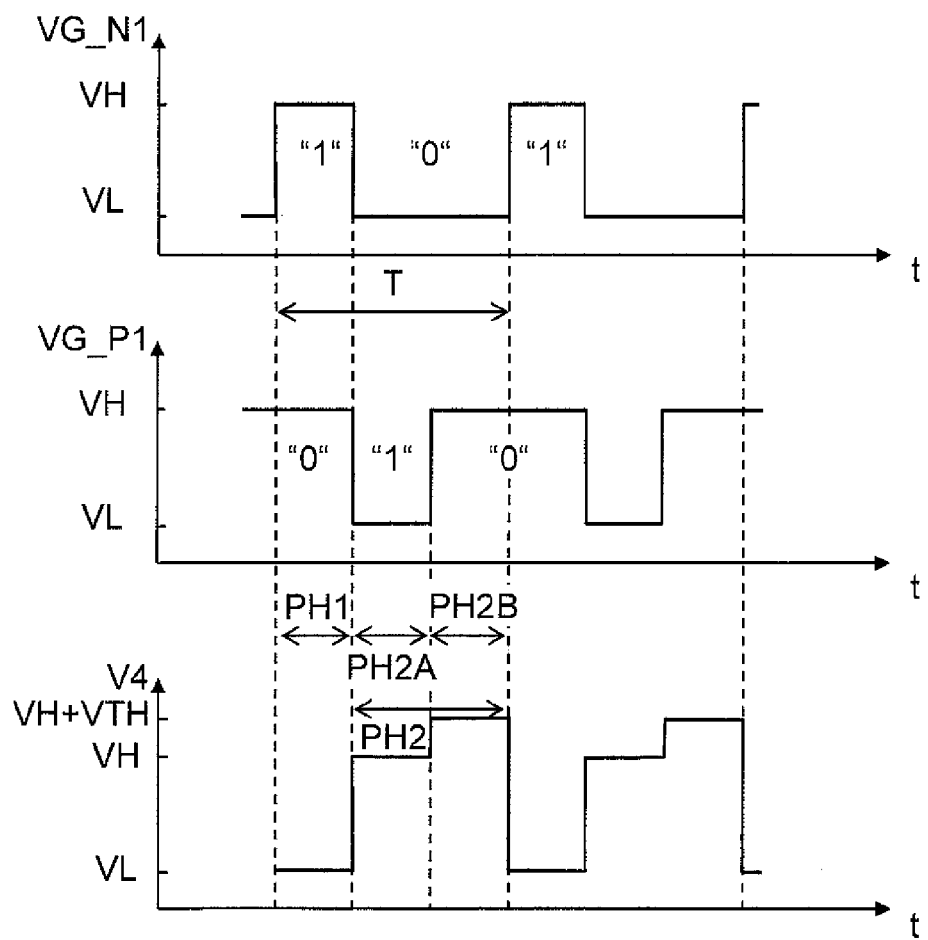
FIG. 2 is a signal-time diagram for signals of the DC/DC converter during down conversion.

FIG. 2 shows a signal-time diagram of signals present in the DC/DC converter during the first mode of operation in which a down conversion is performed. The upmost diagram shows a gate voltage VG_N1 of the N-FET N1. The middle diagram shows the respective gate voltage VG_P1 of the P-FET P1. The lower diagram shows respective voltage V4 resulting at the second terminal 4 of the inductive element L.

As can be seen from the diagram, gate voltages VG_N1, VG_P1 are provided periodically to the respective gate connections with a clock period of T. In this exemplary embodiment, the clock period T is divided into a first phase PH1 and a second phase PH2, wherein the second phase PH2 consists of a first sub-phase PH2A and a second sub-phase PH2B.

During the first phase PH1, a voltage VH is provided to the gate connection of transistor N1, resulting in a closed state of the transistor N1. The same voltage VH is provided to the gate terminal GP1 of transistor P1 resulting in an open state of P-FET P1.

During the first sub-phase PH2A, a low voltage VL is applied to both the gate of transistor N1 and the gate of transistor P1, resulting in an open state of transistor N1 and a closed state of transistor P1.

During the second sub-phase PH2B, the transistor N1 remains in the open state, whereas the voltage VH is provided to the gate terminal GP1 of transistor P1 resulting in a theoretically open state of the P-FET P1.

The high voltage VH can, for example, be the input voltage VIN, the output voltage VOUT or any other voltage which is higher than a difference between the output voltage and a threshold voltage of the P-FET P1. The low voltage VL, for example, corresponds to the voltage at the reference potential connection 3.

Figure 3:
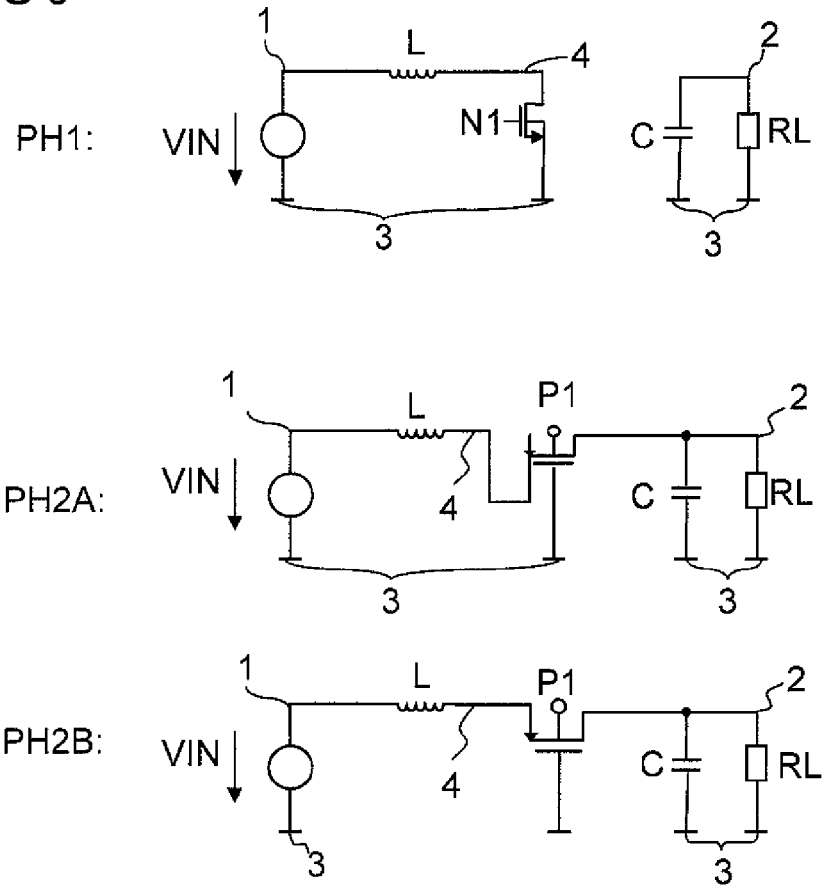
FIG. 3 shows exemplary equivalent circuits of the DC/DC converter during down conversion.

FIG. 3 shows respective equivalent circuits of the DC/DC converter for the first phase PH1 and the first and the second sub-phases PH2A, PH2B.

During the first phase PH1, the transistor N1 is closed such that second terminal 4 of the inductive element L is connected to the reference potential connection 3. Because of the voltage VIN over the inductive element L, current is flowing through the inductive element L, resulting in stored energy within the inductive element L. As can be seen from FIG. 3, there is no connection between the second terminal 4 and the output connection 2 during the first phase PH1. With reference to FIG. 2, the voltage V4 results to the low voltage VL at the reference potential connection 3.

In a second equivalent circuit of FIG. 3, corresponding to the first sub-phase PH2A, the N-FET N1 is in an open state such that there is no connection between the second terminal 4 and the reference potential connection 3. However, due to the low voltage VL at the reference potential connection 3 provided to the gate terminal of P1, transistor P1 is fully closed, thus connecting the second terminal 4 to the output connection 2. Accordingly, current is flowing from the inductive element L to the output connection 2, thus transferring energy from the inductive element to a load RL connected to the output connection 2 and to the charge store C. As the input voltage VIN is higher than the output voltage VOUT, the current through the inductive element L is increasing, storing further energy in inductive element L. The voltage V4 results in the high voltage VH, for example the output voltage VOUT in this case, as can be seen from FIG. 2.

The third equivalent circuit in FIG. 3 shows a configuration of the DC/DC converter during the second sub-phase PH2B, during which the gate connection of the P-FET P1 is connected to the output connection 2 such that the output voltage VOUT is provided to the gate of P1. Accordingly, in the second sub-phase PH2B, the P-FET P1 is in an open state, but the saved energy in the inductive element L has to be discharged. As a consequence, a current still flows from the input connection 1 to the output connection 2. However, the current from input connection 1 to output connection 2 is decreasing. To make a current flow over the theoretically open P-FET P1 possible, the voltage V4 at the second terminal 4 is changing such that it is about a threshold voltage higher than the respective gate voltage of P1. In other words, a gate-source voltage of the P-FET P1 is about the respective threshold voltage. The P-FET P1 is therefore operated in its linear region or in an ohmic mode, respectively. With respect to FIG. 2, the voltage V4 rises to the high voltage VH plus the threshold voltage VTH of the P-FET P1.

If no or little current is drawn at the output connection 2, for example by the load RL, the output voltage VOUT is increasing. However, if the detection unit within the control unit CTL detects that the output voltage VOUT is higher than the desired value, for example by a predetermined percentage, the DC/DC converter is switched to the third mode of operation, namely the power save mode. During this mode, both the N-FET N1 and the P-FET P1 are in an open state such that no current can flow and be stored in the inductive element L. As a consequence, the output voltage VOUT is reduced by the current drawn by the load RL until it falls below a predetermined level, for example given by the desired value minus a predetermined percentage. If this voltage is reached and the input voltage VIN is still higher than the desired value of the output voltage VOUT, the DC/DC converter is switched back to the first mode of operation, namely the down conversion. However, the third mode of operation is not necessary in any case of down conversion. As an alternative, a duration of the second sub-phase PH2B can be elongated instead.

FIGS. 2 and 3 show an exemplary embodiment of a control scheme of the DC/DC converter. However, various modifications to the different phases and sub-phases can be made. Preferably, the first phase PH1 and the second phase PH2 are alternating within respective clock periods T. The second phase can comprise three or more sub-phases, wherein a control of the transistors N1, P1 corresponds to the first and the second sub-phase PH2A, PH2B. Furthermore, it should be noted that respective durations of the first phase PH1 and the sub-phases PH2A, PH2B are neither shown to scale nor have necessarily fixed values.

For example, the duration of the first phase PH1 can be set depending on a desired value of the output voltage VOUT. The first sub-phase PH2A can have a fixed duration. However, a duration of the second sub-phase can be adjusted depending on a ratio between the input voltage VIN and the output voltage VOUT or the desired value of the output voltage VOUT, respectively. To this end, the control unit CTL may comprise further circuitry which is not shown here for reasons of a better overview. The duration of the first or the second sub-phase PH2A, PH2B can also be adjusted depending on a current drawn by a load connected to the output connection, wherein also in this case, additional circuitry may be implemented in the control unit CTL. The first and the second sub-phase PH2A, PH2B can further be adjusted in order to achieve a desired line regulation value, representing variations of the output voltage VOUT.

The detection unit or the control unit CTL, respectively, can be configured to detect the highest voltage within the DC/DC converter which is then provided at the output terminal CB to the bulk terminal BP1 of P-FET P1. This measure may be necessary to prevent an intrinsic diode between a source connection of P1 and the bulk connection BP1 to become conductive.

The first mode of operation, namely the down conversion mode, is, for example, needed if the DC/DC converter is operated by a battery driven input voltage, for example in a mobile device. If the battery is fully charged, the input voltage VIN may be higher than the desired output voltage such that down conversion is to be applied. However, if the battery gets discharged, the input voltage VIN will fall below a desired output voltage at some time. In this case, it will be necessary to perform an up conversion of the input voltage VIN to the desired output voltage VOUT.

To this end, the detection unit or the control unit, respectively, is configured to detect the second mode of operation in which the input voltage VIN is lower than the desired value of the output voltage VOUT. Upon detection of the second mode of operation, namely the up conversion mode, the switching scheme for the transistors N1, P1 is changed.

Figure 4:
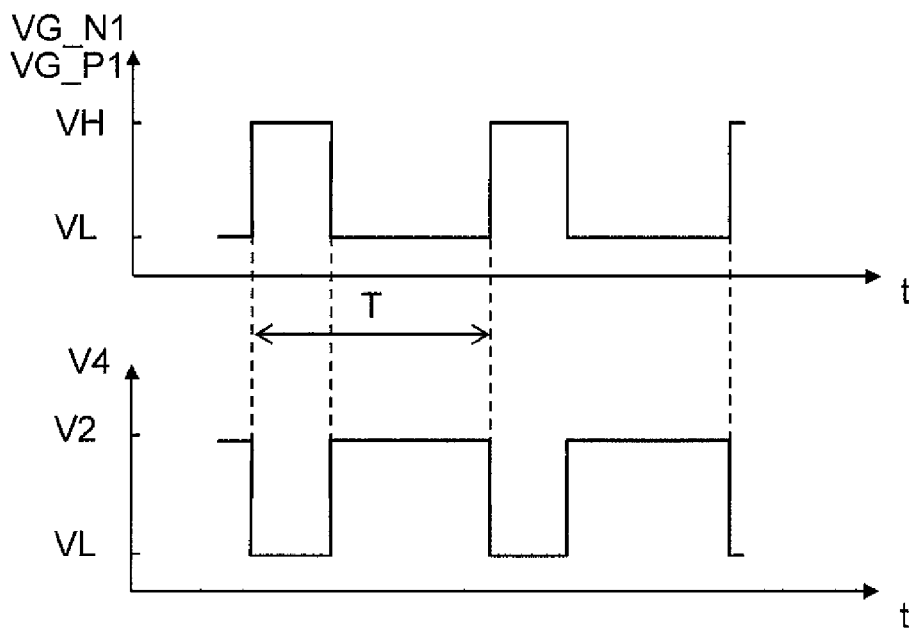
FIG. 4 shows a signal-time diagram of signals of the DC/DC converter during up conversion.

FIG. 4 shows a signal-time diagram of signals within the DC/DC converter during the second mode of operation. As can be seen from the upper diagram, high voltage VH and low voltage VL are provided alternating to both gate connections of N-FET N1 and P-FET P1, which results in the N-FET being in a closed state while the P-FET is in an open state and the N-FET being in an open state while the P-FET is in a closed state. In other words, the N-FET N1 and the P-FET P1 are conversely controlled to an open and to a closed state. The lower diagram of FIG. 4 shows the resulting voltage V4 at the second terminal 4 of the inductive element L in response to the switching of the transistors N1, P1. For example, if the transistor N1 is in a closed state, V4 is at the low voltage VL, for example corresponding to the voltage at the reference potential connection 3. If the P-FET P1 is in a closed state, the second terminal 4 is directly connected to the output connection 2, thus resulting in a voltage V2 at the output connection 2 being present at the terminal 4. The duty cycle of the respective switching signals in the second mode of operation is depending on the desired value of the output voltage VOUT. However, the process of up conversion will not be described in more detail here, as this is well known in the art.

With reference to the down conversion mode described above, a bigger loss of energy, compared to always existing technological based losses, can only happen during the second sub-phase. Accordingly, down conversion can be performed with a high efficiency. As a further consequence, power can be saved and a battery connected to the input connection can be used longer. As the output voltage can increase during the down conversion mode, a power save mode can be employed, reducing the switching of the transistors. The electromagnetic compatibility is improved. Since during the first sub-phase, the P-FET is fully open, DC/DC converters can provide higher load currents. Furthermore, an improve line regulation can be achieved.

The respective durations of the phases and sub-phases described above can be adjusted to get optimal results, depending on the various scenarios described above. As the DC/DC converter can be used for both up conversion and down conversion, a range of possible input and output voltages is increased compared to conventional solutions. The DC/DC converter can be operated with low voltages at the second terminal 4 to which the N-FET N1 is connected. As a consequence, possible leakage of the N-FET N1 can be reduced during down conversion. Furthermore, the N-FET N1 is therefore better protected against damage or destruction.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A DC/DC converter, comprising:
   an input connection to receive an input voltage;
   an output connection to provide an output voltage;
   a reference potential connection;
   an inductive element having a first terminal connected to the input connection;
   a first switching element coupling a second terminal of the inductive element to the reference potential connection;
   a second switching element coupling the second terminal of the inductive element to the output connection, the second switching element being a p-channel field effect transistor, P-FET; and
   a control unit comprising a detection unit which is configured to detect a first mode of operation in which the input voltage is higher than a desired value of the output voltage;
   wherein the control unit is configured, upon detection of the first mode of operation, during a first phase, to control the first switching element to a closed state and the second switching element to an open state, during a second phase which comprises a first sub-phase and a second sub-phase, to control the first switching element to an open state, during the first sub-phase, to control the second switching element to a closed state, and, during the second sub-phase, to provide a control voltage to a gate terminal of the second switching element which is higher than a difference between the output voltage and a threshold voltage of the second switching element.

2. The DC/DC converter according to claim 1, wherein the control unit is configured, upon detection of the first mode of operation, during the second sub-phase, to provide a control voltage to the gate terminal of the second switching element which is higher than a difference between the input voltage and the threshold voltage of the second switching element.

3. The DC/DC converter according to claim 1, wherein, upon detection of the first mode of operation, the second phase comprises at least one further sub-phase during which the second switching element is controlled according to the control of the first sub-phase or of the second sub-phase.

4. The DC/DC converter according to claim 1, wherein, upon detection of the first mode of operation, the first phase and the second phase are alternating within clock periods determined by a reference clock signal.

5. The DC/DC converter according to claim 1, wherein, upon detection of the first mode of operation, a duration of the first phase is set depending on the desired value of the output voltage.

6. The DC/DC converter according to claim 1, wherein, upon detection of the first mode of operation, a duration of the first sub-phase or of the second sub-phase is adjusted depending on at least one of the following:
   a ratio between the input voltage and the output voltage;
   a current drawn by a load connected to the output connection; and
   a desired line regulation value.

7. The DC/DC converter according to claim 1, wherein the detection unit is configured to detect a second mode of operation in which the input voltage is lower than the desired value of the output voltage and wherein the control unit is configured, upon detection of the second mode of operation, to alternately and conversely control the first switching element and the second switching element between an open state and a closed state, wherein a respective duty cycle is depending on the desired value of the output voltage.

8. The DC/DC converter according to claim 1, wherein the detection unit is configured to detect a third mode of operation in which the output voltage is higher than the desired value of the output voltage and wherein the control unit is configured, upon detection of the third mode of operation, to control both the first switching element and the second switching element to an open state.

9. The DC/DC converter according to claim 1, wherein the first switching element is an n-channel field effect transistor, N-FET.

10. The DC/DC converter according to claim 9, wherein the first switching element and the second switching element are field effect transistors of an enhancement type.

11. The DC/DC converter according to claim 1, wherein the detection unit is configured to detect a maximum voltage within the DC/DC converter and wherein the control unit is configured to provide said maximum voltage to a bulk terminal of the second switching element.

12. The DC/DC converter according to claim 1, wherein a charge store is connected to the output connection.

13. A method for controlling a DC/DC converter,
   the DC/DC converter comprising an input connection to receive an input voltage, an output connection to provide an output voltage, a reference potential connection, an inductive element having a first terminal connected to the input connection, a first switching element coupling a second terminal of the inductive element to the reference potential connection, and a second switching element coupling the second terminal of the inductive element to the output connection, the second switching element being a p-channel field effect transistor, P-FET;
   the method comprising detecting a first mode of operation in which the input voltage is higher than a desired value of the output voltage, and, upon detection of the first mode of operation, performing the following:
      during a first phase, controlling the first switching element to a closed state and the second switching element to an open state;
      during a second phase which comprises a first sub-phase and a second sub-phase, controlling the first switching element to an open state;
      during the first sub-phase, controlling the second switching element to a closed state; and
      during the second sub-phase, providing a control voltage to a gate terminal of the second switching element which is higher than a difference between the output voltage and a threshold voltage of the second switching element.

14. The method according to claim 13, further comprising:
   detecting a second mode of operation in which the input voltage is lower than the desired value of the output voltage; and
   upon detection of the second mode of operation, alternately and conversely controlling the first switching element and the second switching element between an open state and a closed state, wherein a respective duty cycle is depending on the desired value of the output voltage.

15. The method according to claim 14, further comprising:
detecting a third mode of operation in which the output voltage is higher than the desired value of the output voltage; and
upon detection of the third mode of operation, controlling both the first switching element and the second switching element to an open state.

16. The method according to claim 13, further comprising:
detecting a third mode of operation in which the output voltage is higher than the desired value of the output voltage; and
upon detection of the third mode of operation, controlling both the first switching element and the second switching element to an open state.

* * * * *